United States Patent
Kelly et al.

(10) Patent No.: US 6,567,728 B1
(45) Date of Patent: May 20, 2003

(54) TERRAIN AWARENESS SYSTEM HAVING NUISANCE ALARM FILTER FOR USE DURING APPROACH

(75) Inventors: Wallace E. Kelly, Apex, NC (US); Serdar Uckun, Palo Alto, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 13 days.

(21) Appl. No.: 09/924,821

(22) Filed: Aug. 8, 2001

(51) Int. Cl.[7] .............................. G08G 5/02; G01S 1/16
(52) U.S. Cl. .............................. 701/9; 701/16; 701/17; 340/951; 340/961
(58) Field of Search .......................... 701/9, 8, 16, 17; 340/947, 948, 951, 954, 960, 961, 976, 979

(56) References Cited

U.S. PATENT DOCUMENTS

| 4,259,658 A | * | 3/1981 | Basov et al. | 340/951 |
| 4,283,705 A | * | 8/1981 | James et al. | 340/973 |
| 4,454,496 A | * | 6/1984 | Lowe | 340/980 |
| 4,495,483 A | * | 1/1985 | Bateman | 340/970 |
| 4,567,483 A | * | 1/1986 | Bateman et al. | 340/970 |
| 5,377,937 A | * | 1/1995 | LaMay et al. | 244/185 |
| 5,523,949 A | * | 6/1996 | Agate et al. | 701/17 |
| 5,839,080 A | * | 11/1998 | Muller et al. | 701/9 |
| 6,002,347 A | * | 12/1999 | Daly et al. | 340/963 |
| 6,085,129 A | * | 7/2000 | Schardt et al. | 701/14 |

* cited by examiner

Primary Examiner—Tan Q. Nguyen
(74) Attorney, Agent, or Firm—Nathan O. Jensen; Kyle Eppele

(57) ABSTRACT

An approach suppressed TAWS system and method for suppressing nuisance alarms based upon a determination that an aircraft is properly aligned for landing based upon location within a safe zone defined by a glideslope component and a localizer component.

18 Claims, 2 Drawing Sheets

TERRAIN AWARENESS SYSTEM HAVING NUISANCE ALARM FILTER FOR USE DURING APPROACH

CROSS REFERENCE TO RELATED APPLICATIONS

This application relates to an application entitled "METHOD AND SYSTEM FOR PROVIDING GROUND PROXIMITY WARNINGS" by Wallace Kelly and Serdar Uckun U.S. Pat. No. 6,452,511, and also relates to another application entitled "CONDITIONAL HAZARD ALERTING DISPLAY", by the same inventors U.S. application Ser. No. 09/924,714, both of said applications being filed concurrently herewith and assigned to a common assignee, said applications being incorporated herein in their entirety by this reference.

FIELD OF THE INVENTION

The present invention generally relates to avionics, and more particularly relates to terrain awareness warning systems, and even more particularly relates to methods and systems for filtering nuisance alarms during approach.

BACKGROUND OF THE INVENTION

In recent years, much effort has been expended in reducing aviation accidents. Enhanced Ground Proximity Warning Systems (EGPWS) have been used in the industry to warn pilots of imminent controlled flight into terrain (CFIT). While these EGPWSs have been used extensively in the past, they do have some drawbacks. These EGPWSs are prone to nuisance alarms, especially during approach. These nuisance alarms are so commonplace that it is often the custom to deactivate the EGPWS during the last few miles from the runway. Deactivation of the EGPWS is clearly an undesirable situation, especially as the aircraft is getting closer and closer to the terrain, and as the pilot's workload is increasing.

Consequently, there exists a need for improved methods and systems for reducing nuisance alarms during approach, thereby reducing the desire to deactivate the entire EGPWS upon approach.

SUMMARY OF THE INVENTION

It is an object of the present invention to provide a system and method for reducing nuisance alarms during approach.

It is a feature of the present invention to suppress terrain alarms if the aircraft is within a predetermined safe zone having glideslope and localizer components.

It is another feature of the present invention to provide the pilot with auditory and/or visual indication of safe descent rates and headings during approach.

It is an advantage of the present invention to achieve improved efficiency in providing TAWS protection during approach and landing.

The present invention is an apparatus and method for providing continuous TAWS protection, designed to satisfy the aforementioned needs, provide the previously stated objects, include the above-listed features, and achieve the already articulated advantages. The present invention is carried out in a "TAWS deactivation-less" manner in a sense that the reasons for a pilot to deactivate a TAWS during approach have been greatly reduced.

Accordingly, the present invention is a system and method for suppressing nuisance TAWS alarms during approach which uses a determination that the aircraft is in a predetermined zone which has a glideslope and a localizer component.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
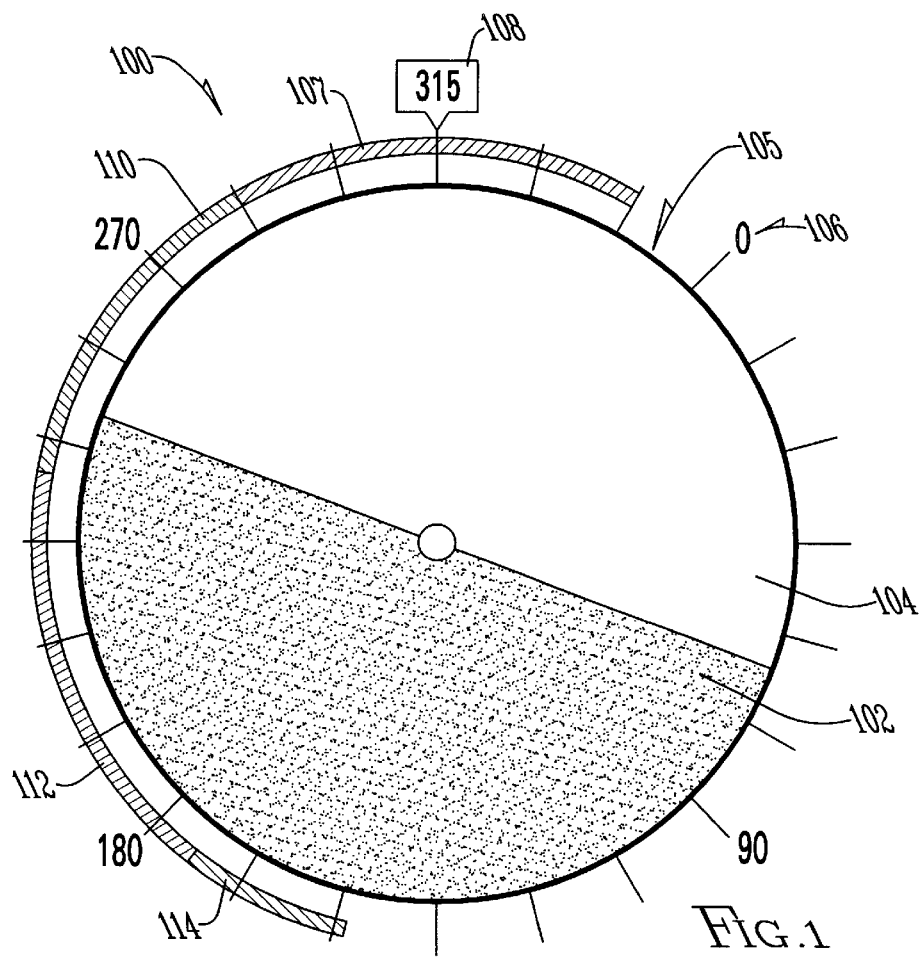
FIG. 1 is an artificial horizon indicator of the present invention which includes a compass rose disposed having a safe heading bar.

Now referring to the drawings wherein like numerals refer to like matter throughout, and more specifically referring to FIG. 1, there is shown an artificial horizon indicator of the present invention, generally designated 100, having a terrain section 102 and a sky section 104, as is well known in the art. Also shown in FIG. 1 is compass rose 105, which is disposed about the centrally disposed artificial horizon indicator 100; compass rose 105 has a North course marking 106 and a current course marking 108. Current course marking 108 is shown at the top of compass rose 105 and is shown with a heading of 315 degrees or a northwest direction. Compass rose 105 is shown having a first low-level undesirable course heading alert 110. Also shown is a critical undesirable course heading alert 112 and a second low-level undesirable course heading alert 114. These alerts 110, 112 and 114 are optional in this invention and are described in detail in the above-referenced patent application entitled "CONDITIONAL HAZARD ALERTING DISPLAY". FIG. 1 also shows a safe heading bar 107, which represents a safe heading based upon the glideslope and localizer zones discussed below in reference to FIG. 4.

Figure 2:
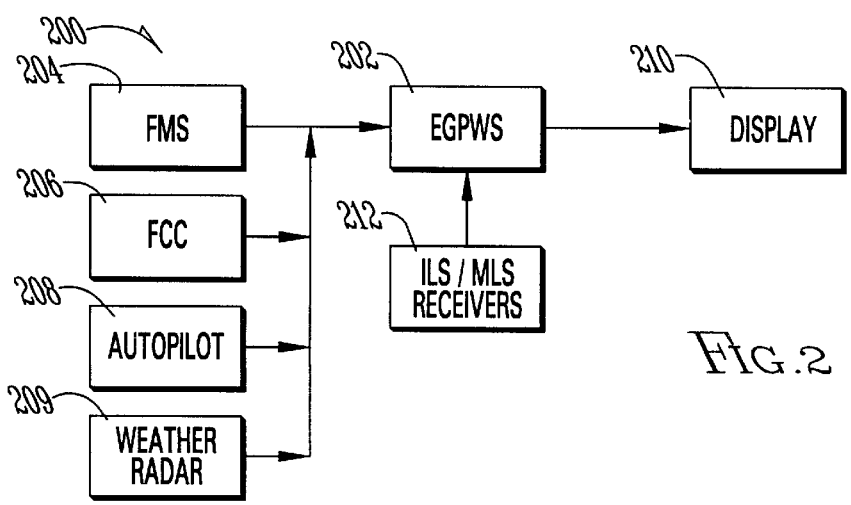
FIG. 2 is a block diagram view of a system of the present invention.

A more detailed understanding of the present invention can be achieved by now referring to FIG. 2, which shows an approach suppressed TAWS 200 of the present invention, which is assumed to be disposed on an approach suppressed TAWS protected aircraft. Approach suppressed TAWS 200 includes a new EGPWS 202 which is similar to well-known prior art EGPWSs except that it has an algorithm and functionality to suppress TAWS warnings based upon location of an aircraft within predetermined glideslope and localizer zones. Also, it makes determinations of safe headings and provides this information to be displayed. Such an approach suppressed TAWS 200 will not only include the EGPWS 202, but it may also include data input from flight management systems (FMS) 204, flight control computer (FCC) 206, and autopilot 208, which can individually or collectively provide information which the EGPWS 202 can use to determine appropriate times and places for enabling the approach suppression feature of the present invention.

In one embodiment of the present invention, the approach suppressed TAWS 200 would not have the approach suppression feature activated unless there is some indication from the pilot, the FMS 204, the FCC 206, the autopilot 208, or the ILS/MLS receivers 212 which indicates that the aircraft is on approach.

Figure 3:
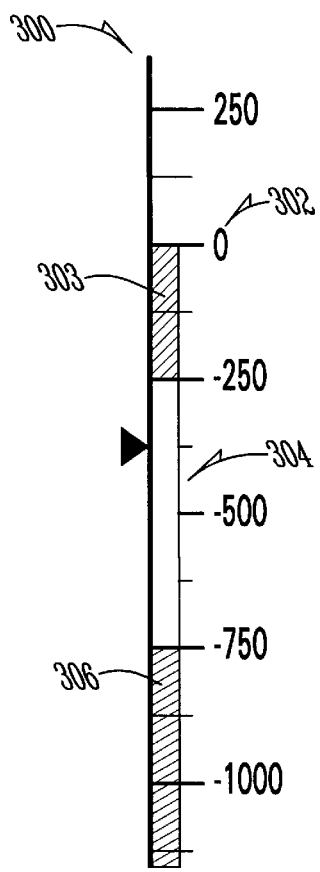
FIG. 3 is a display of the present invention showing a vertical speed indicator having safe vertical speed bar.

Approach suppressed TAWS 200 includes a display 210 which could be similar to that which is described in FIGS. 1 and 3. This display gives a pilot an instantaneous display of the safe headings and safe descent rates. Numerous other instantaneous displays of safe headings and safe vertical speeds are contemplated as well.

Now referring to FIG. 3, there is shown just one example of many possible examples of how a pilot might be provided with information relating to safe descent rates upon approach. FIG. 3 includes an enhanced vertical speed indicator 300, which includes a level flight marker 302 which indicates no vertical speed. Also shown are low-level vertical speed alert indicator bar 304 and critical vertical speed alert indicator bar 306. These indicator bars are optional and are described in detail in the above-referenced patent application entitled "CONDITIONAL HAZARD ALERTING DISPLAY". FIG. 3 also shows a safe descent rate bar 303, which could be used to provide the pilot with information on safe descent rates.

Figure 4:
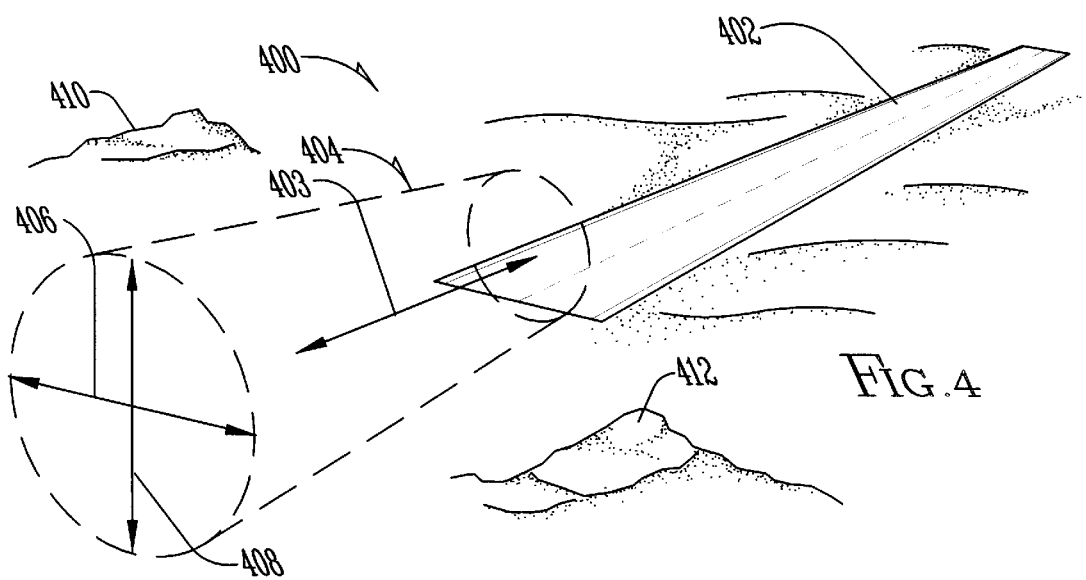
FIG. 4 is a perspective view of an airport with a safe zone shown in dotted lines.

A full understanding of the present invention can be obtained by now referring to FIG. 4, which shows a perspective view of airport runway 402 and the surrounding area. A safe zone 404, having a glideslope component 408 and localizer component 406, is shown in dotted lines. Localizer component 406 is dependent upon a predetermined horizontal angle centered about a vertical plane passing through said airport runway 402 and containing the safe zone axis 403. Glideslope component 408 is dependent upon a predetermined vertical angle above a plane substantially defining the surface of said airport runway 402. Safe zone 404 can be established in several ways. First of all, safe zone 404 could be calculated in advance and be stored in a terrain database associated with EGPWS 202. In such situations, it would need to be determined in advance what the appropriate angles are for the localizer component 406 and the glideslope component 408. Safe zone 404 could be viewed as a truncated cone with an axis extending along a line parallel with airport runway 402 and at a predetermined upward slope. Safe zone 404 could be determined to have a longitudinal limit along the axis such that beyond the longitudinal limit is not included in the safe zone 404. If a GPS or other position device associated with the EGPWS 202 determines that the aircraft is located within safe zone 404, then the alarms which otherwise might be issued by EGPWS 202 are suppressed so long as the aircraft remains in safe zone 404. If the aircraft departs the safe zone 404, then the approach suppression feature of the present invention is not activated, and the approach suppressed TAWS 200 would issue alerts in a normal manner, and those alerts would not be suppressed.

In an alternate embodiment of the present invention, ILS/MLS receivers 212 provide input to the EGPWS 202 such that the glideslope and localizer beams can indicate that the aircraft is properly aligned for landing. In such situations and, so long as the aircraft remains properly aligned with the airport runway 402 as determined by the ILS/MLS receivers 212, the approach suppression feature of the present invention is activated, and the TAWS alerts which are continuously being calculated are suppressed.

In operation, the apparatus and method of the present invention as described in FIGS. 1–4, could function as follows:

1. An aircraft equipped with approach suppressed TAWS 200 approaches an airport runway 402 in a very mountainous valley having a first mountain slope 410 and a second mountain slope 412 in close proximity thereto. First mountain slope 410 and second mountain slope 412 are sufficiently close to the airport runway 402, that absent the present invention, a TAWS alert would be issued when an aircraft makes a landing.

2. The approach suppressed TAWS 200 makes a determination that an alert should be issued under normal TAWS operational procedures. Before the TAWS alert is issued and the pilot and crew are notified, a determination is made as to whether the aircraft is in a safe zone 404. If the determination is that the aircraft is within the safe zone 404, then the TAWS alert is suppressed and the aircraft proceeds with the approach and landing without receiving a nuisance alert. If the determination is that the aircraft is not in the safe zone 404, then no suppression occurs, and the TAWS alert is issued.

Throughout this description, reference may be made to ground proximity warning systems, EGPWS, TAWS, GCAS, GPWS and ground prox, because it is believed that they are synonyms of each other and the various systems and proposed systems for giving a pilot a warning of a potential CFIT situation. Similarly, the terms "alarm", "alert", and "warning" are used interchangeably throughout this document. It is the intention of the present invention that any such system for providing advance CFIT warnings would benefit from the present invention and that the terms used in the claims are intended to mean any of these systems.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An apparatus for assisting in reducing nuisance ground proximity warning systems alerts, the apparatus comprising:
   a ground proximity warning system which is adapted and configured to provide warnings to a pilot of possible controlled flight into terrain situations; and,
   a first algorithm, adapted and configured to cooperate with said ground proximity warning system, said first algorithm adapted and configured to make a determination that the aircraft is in a safe zone having a localizer component and a glideslope component which define a safe zone centrally disposed around a safe zone axis extending in a plane containing an airport runway.

2. An apparatus of claim 1 wherein:
   said determination utilizes a predetermined safe zone and a positioning system to provide current position of the aircraft.

3. An apparatus of claim 1 wherein an instrument landing system receiver is coupled to said ground proximity warning system and provides information used to determine whether the aircraft is in said safe zone.

4. An apparatus of claim 3 further comprising:
   a second algorithm, adapted and configured to cooperate with said ground proximity warning system, said second algorithm makes a safe heading determination of a plurality of safe headings for said aircraft; and
   a display which is responsive to said safe heading determination and provides a visual indication of safe headings to a pilot.

5. An apparatus of claim 4 wherein said first algorithm and said second algorithm are executed by said ground proximity warning system.

6. An apparatus of claim 5 wherein said first algorithm and said second algorithm are portions of an algorithm used by said ground proximity warning system to provide warnings based upon current heading and current vertical speed.

7. A method of reducing nuisance terrain warning alerts, comprising the steps of:

provided a ground proximity warning system which utilizes a positioning system and a terrain database;

making a determination of a location of an aircraft within a safe zone which is defined by a glideslope component and a localizer component; and, suppressing an alert from said ground proximity warning system in response to said determination of location.

8. A method of claim 7 wherein said step of making a determination of a location utilizes an instrument landing system receiver.

9. A method of claim 8 further comprising the step of displaying to a pilot safe headings.

10. A method of claim 9 further comprising the step of making a determination of safe negative vertical speeds.

11. A method of claim 10 further comprising the step of displaying a plurality safe negative vertical speeds.

12. A method of claim 11 wherein said safe negative vertical speeds are displayed as a colored line disposed adjacent to a vertical speed.

13. A method of claim 7 wherein said step of making a determination of location utilizes a predetermined safe zone.

14. A system comprising:

a ground proximity warning system which is adapted and configured to generate warnings based upon current speed, current heading and current location of a protected aircraft; and, means for suppressing a warning from said ground proximity warning system in response to a determination that an aircraft is disposed within a safe zone defined by a glideslope component and a localizer component.

15. A system of claim 14 wherein said means for suppressing is responsive to an instrument landing system receiver.

16. A system of claim 15 further comprising means for notifying a pilot of safe heading and descent rates.

17. A system of claim 16 wherein said means for notifying is a display providing information relating to safe headings of said protected aircraft, wherein said safe headings are depicted as bars disposed about a compass rose.

18. A system of claim 14 wherein said means for suppressing utilizes a comparison of current position of the aircraft to a predetermined safe zone.

* * * * *